US010963721B2

(12) United States Patent
Georgis

(10) Patent No.: US 10,963,721 B2
(45) Date of Patent: Mar. 30, 2021

(54) LICENSE PLATE NUMBER RECOGNITION BASED ON THREE DIMENSIONAL BEAM SEARCH

(71) Applicant: SONY CORPORATION, Tokyo (JP)

(72) Inventor: Nikolaos Georgis, San Diego, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/127,113

(22) Filed: Sep. 10, 2018

(65) Prior Publication Data

US 2020/0082196 A1 Mar. 12, 2020

(51) Int. Cl.
*G06K 9/32* (2006.01)
*G06N 3/04* (2006.01)
*G06K 9/34* (2006.01)
*G06K 9/62* (2006.01)
*G06N 3/08* (2006.01)

(52) U.S. Cl.
CPC .......... *G06K 9/3258* (2013.01); *G06K 9/344* (2013.01); *G06K 9/6256* (2013.01); *G06N 3/0454* (2013.01); *G06N 3/08* (2013.01); *G06K 2209/01* (2013.01); *G06K 2209/15* (2013.01)

(58) Field of Classification Search
CPC .... G06K 9/3258; G06K 9/344; G06K 9/6256; G06K 2209/01; G06K 2209/15; G06N 3/0454; G06N 3/08
See application file for complete search history.

(56) References Cited

U.S. PATENT DOCUMENTS

2017/0148431 A1 5/2017 Catanzaro et al.
2017/0300786 A1* 10/2017 Gope ................. G06K 9/00791
2018/0025721 A1 1/2018 Li et al.
(Continued)

FOREIGN PATENT DOCUMENTS

CN 107239733 A 10/2017

OTHER PUBLICATIONS

Li et al ("Reading Car License Plates Using Deep Convolutional Neural Networks and LSTMs", arXiv:1601.05610, pp. 1-17, retrieved from https://arxiv.org/abs/1601.05610 on Mar. 9, 2020) (Year: 2016).*
(Continued)

*Primary Examiner* — Leon Viet Q Nguyen
(74) *Attorney, Agent, or Firm* — Chip Law Group

(57) ABSTRACT

An electronic device for license plate recognition includes control circuitry and a memory that stores a sequence of image frames. The control circuitry extracts a first set of license plate images from the sequence of image frames and estimates a set of two dimensional (2D) connectionist-temporal-classification (CTC) matrices based on application of a pre-trained CTC-based deep neural network (DNN) on the first set of license plate images. The control circuitry further generates a three dimensional (3D) CTC matrix from the estimated set of 2D CTC matrices and decodes a set of alphanumeric characters of a license plate number of a first license plate. The set of alphanumeric characters are decoded based on a 3D beam search through the generated 3D CTC matrix. The decoded set of alphanumeric characters correspond to maximum likelihood values for the decoded set of alphanumeric characters in the 3D beam search.

20 Claims, 6 Drawing Sheets

(56) References Cited

U.S. PATENT DOCUMENTS

2018/0101750 A1* 4/2018 Soldevila ............... G06N 3/08

OTHER PUBLICATIONS

Mahmoudi, et al., "A Probabilistic Approach for 3D Shape Retrieval by Characteristic Views", Pattern Recognition Letters, Apr. 27, 2007, pp. 1705-1718.

Vijayakumar, et al., Diverse Beam Search: Decoding Diverse Solutions from Neural Sequence Models, Under review as a conference paper at ICLR, 2017, 18 pages.

* cited by examiner

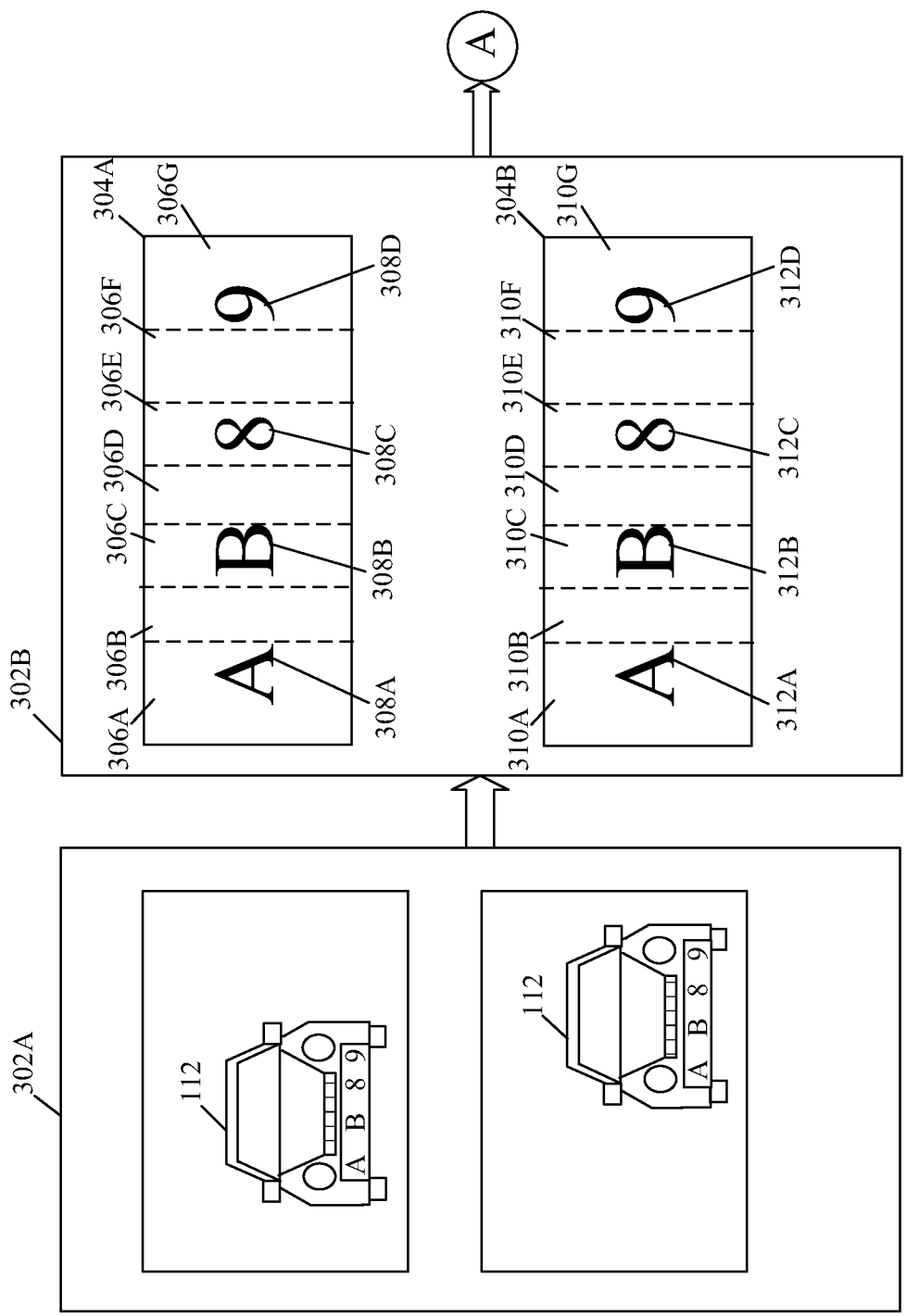

LICENSE PLATE NUMBER RECOGNITION BASED ON THREE DIMENSIONAL BEAM SEARCH

CROSS-REFERENCE TO RELATED APPLICATIONS/INCORPORATION BY REFERENCE

None.

FIELD

Various embodiments of the disclosure relate to deep learning technologies in character recognition. More specifically, various embodiments of the disclosure relate to an electronic device for license plate number recognition based on three dimensional (3D) beam search.

BACKGROUND

Recent advancements in the field of deep learning has led to development of various methods and techniques for character recognition from license plates in live videos. In current solutions, a conventional electronic device may extract a license plate number of a vehicle by use a brute force character recognition approach. In the brute force character recognition approach, the conventional electronic device may apply optical character recognition (OCR) on different image frames of a video and extract a license plate number based on OCR-based recognition of different alphanumeric characters in different image frames of the license plate. Extraction of the license plate number by using conventional OCR techniques on different image frames may be a computationally resource intensive process. Also, due to motion of a vehicle, rolling shutter of camera, or ambient environment may introduce a noise in identification of a correct license number plate. Thus, a conventional electronic device may output different license plate numbers, which may include a correct license plate number and multiple erroneous license plate numbers from different image frames of a license plate. This may further lead to confusion and a bias among different users who need to identify a desired vehicle from the correct license plate number, without manually checking and selecting a correct license plate number from different license plate numbers.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device for license plate number recognition based on three dimensional (3D) beam search is provided, substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A and 3B, collectively, illustrate an exemplary scenario for license plate number recognition based on 3D beam search by the electronic device of FIG. 2, in accordance with an embodiment of the disclosure.

DETAILED DESCRIPTION

Certain embodiments of the disclosure may be found in an electronic device. Various embodiments of the disclosure may provide the electronic device that may include a memory and control circuitry communicatively coupled to the memory. The memory may be configured to store a sequence of image frames that may include a first set of license plate images of one or more license plates. The disclosed electronic device may be configured to identify the license plate number of a vehicle by application of an incremental 3D beam searching operation in a 3D connectionist-temporal-classification (CTC) matrix, which corresponds to a plurality of CTC logits that represent likelihood of occurrence of different alphanumeric characters for spatial samples of the different images of the license plates. The incremental 3D beam searching operation in the CTC logits facilitate accurate and efficient recognition without decoding all CTC probabilities. Instead, only prominent likelihood values (e.g., two or more maximum likelihood paths) may be decoded to identify a single license plate number among multiple noisy images of one or more license number plates. This may remove redundancy in false identification of a license plate number and improve a single accurate result per license plate. The removal of redundancy in false identification of the license plate number enables concerned law enforcement authorities to take suitable decision and action based on the identification of the license plate number in real time or near-real time.

Figure 1:
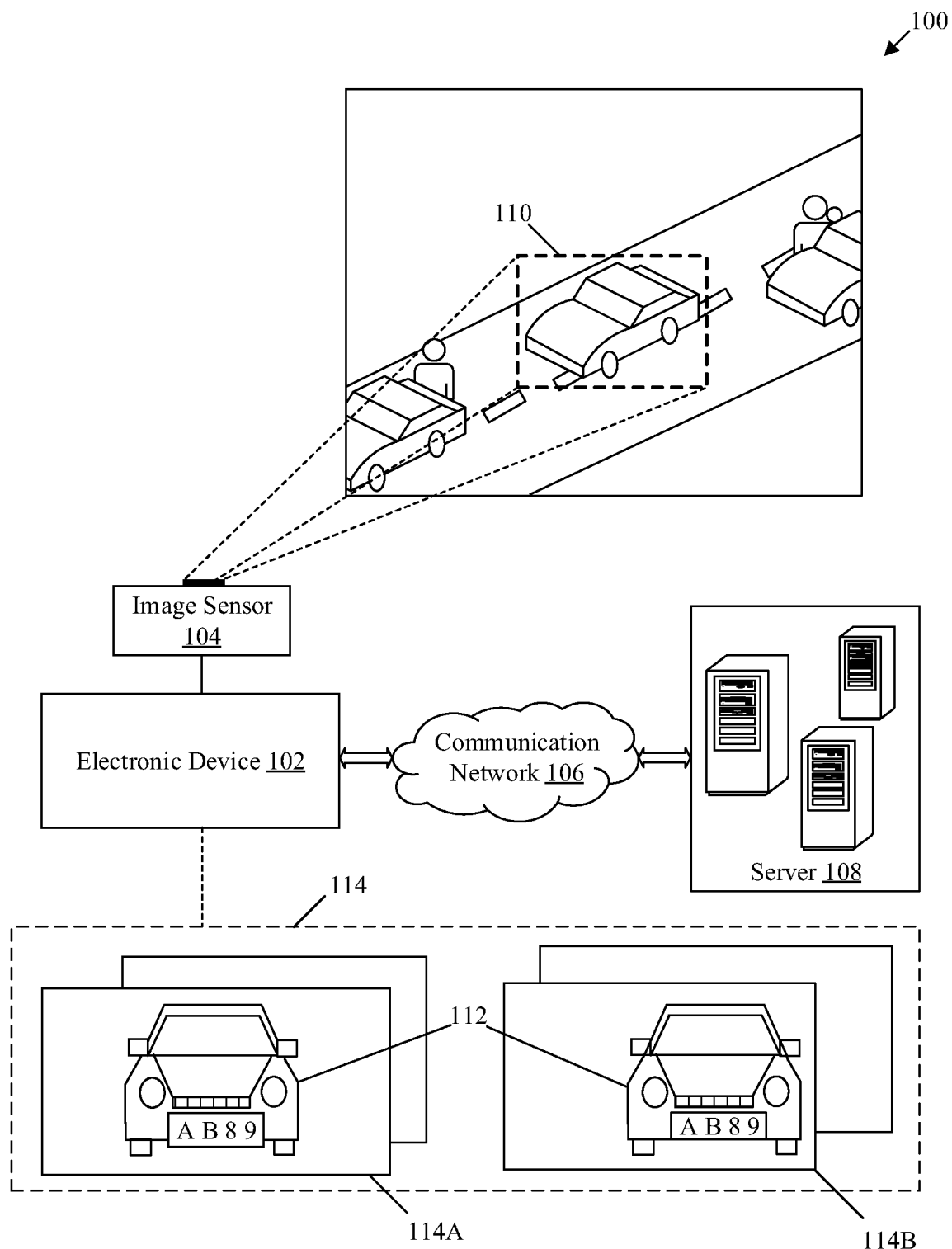
FIG. 1 is a block diagram that illustrates an exemplary environment for an electronic device for license plate number recognition based on three dimensional (3D) beam search, in accordance with an embodiment of the disclosure.

FIG. 1 is a block diagram that illustrates an exemplary environment for an electronic device for license plate number recognition based on three dimensional (3D) beam search, in accordance with an embodiment of the disclosure. With reference to FIG. 1, there is shown a network environment 100 that includes an electronic device 102, an image sensor 104, a communication network 106, and a server 108. As shown, the electronic device 102 is communicatively coupled to the image sensor 104; however, in some embodiments, the image sensor 104 may be an embedded component of the electronic device 102.

The electronic device 102 may include suitable logic, circuitry, interfaces, and/or code that may be configured to identify a license plate number of a vehicle from a sequence of image frames. The license plate number may be identified based on decoding a set of alphanumeric characters of the license plate number from different image frames in the sequence of image frames. Examples of the electronic device 102 may include, but are not limited to, a vehicle tracker device, a surveillance device, a vehicle traffic monitoring device, a drone, a security device/camera, a digital cam, a computer workstation, a mainframe computer, a handheld computer, a cellular/mobile phone, and other computing devices. In certain embodiments, the electronic device 102 may be a digital camera, such as a handheld video cam, a traffic camera, a closed-circuit television (CCTV) camera, a body camera (e.g. a police body camera), a dash camera (e.g., a dash camera on-board a police vehicle), or an in-vehicle camera.

The image sensor 104 may include suitable logic, circuitry, interfaces, and/or code that may be configured to capture a sequence of image frames of a scene in a field-of-view (FOV) (e.g. a FOV 110) of the image sensor 104. The scene in the sequence of image frames may include one or more vehicles and/or one or more license plates of same or different vehicles. The sequence of image frames may be part of a live video feed or independent shots of one or more vehicles and/or one or more license plates of same or different vehicles at different time-intervals. In some embodiments, the image sensor 104 may be implemented as an active pixel sensor, such as a complementary-metal-oxide semiconductor (CMOS) sensor. In other embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The communication network 106 may include a medium through which the electronic device 102 may communicate with the server 108. Examples of the communication network 106 may include, but are not limited to, Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The server 108 may include suitable circuitry, interfaces, and/or code that may be configured to act as a central store or repository of vehicle registration numbers, license plate information, owner information, and/or live video feeds of different vehicles. Also, in some embodiments, the server 108 may be configured to train a connectionist-temporal-classification (CTC)-based deep neural network (DNN) for identification of license plate number from different image frames stored on the server 108 or received in real time. The server 108 may be configured to communicate with the electronic device 102, via the communication network 106. Examples of the server 108 may include, but are not limited to, an application server, a cloud server, a web server, a database server, a file server, a mainframe server, or a combination thereof.

In operation, the electronic device 102 may be configured to receive a sequence of image frames associated with one or more vehicles (e.g., a vehicle 112). Examples of the vehicle may include, but are not limited to a car, a bike, a truck, a bus, a drone, or other vehicles. The sequence of image frames may be received from the image sensor 104, which may be integrated with the electronic device 102 or may be part of a remote camera which may be installed in multiple locations. The sequence of image frames may correspond to a live video feed, a delayed video feed, or snapshots of one or more vehicles from the image sensor, such as a CCTV cam, a traffic cam, a body cam, or a dash camera on a surveillance or patrol vehicle. Alternatively, the sequence of image frames may be retrieved from the server 108. In such a case, the server 108 may be configured to receive a live or delayed video feed of different vehicles from one or more locations of a particular area (e.g., a road portion) and the electronic device 102 may be configured to retrieve a sequence of image frames from a specific video feed or from multiple video feeds.

In accordance with an embodiment, the electronic device 102 may be configured to receive a hotlist of vehicles that may include at least a set of license plate identifiers of a set of vehicles. The hotlist of vehicles may be a data file received from a law enforcement entity and may include a defined number of license plate identifiers (e.g., vehicle license plate numbers), of certain suspect vehicles, stolen license plates, stolen vehicles, vehicles of wanted persons, and other vehicles or persons sought by the law enforcement entity. The electronic device 102 may be configured to periodically extract the hotlist of vehicles from dedicated servers at different time of day for an up-to-date list. Such dedicated servers (e.g., National Motor Vehicle Title Information System (NMVTIS)) may be owned, managed, or operated by an entity (e.g., department of motor vehicles (DMV)) that administers issuance of driver licenses, license plate numbers, and/or vehicle registrations for a specific geographical area, such as a state or at a federal level. In response to receipt of the hotlist, the electronic device 102 may be configured to activate the image sensor 104 to capture the sequence of image frames of one or more vehicles in a field-of-view of the image sensor 104.

The electronic device 102 may be further configured to extract a first set of license plate images of one or more license plates, from the sequence of image frames (e.g., a sequence of image frames 114, such as a first image frame 114A and a second image frame 114B). The first set of license plate images may include at least one image portion that depicts a first license plate (e.g., "AB89" as shown in an example). The first license plate may be a target license plate of a first vehicle for which a recognition of a license plate number may be required. In some cases, the target license plate may correspond to a vehicle hot-listed in the received hotlist of vehicles. In accordance with another embodiment, the first set of license plate images may depict a first vehicle (e.g., the vehicle 112) from a view captured within a FOV (e.g., the FOV 110) of the image sensor 104. The view may be a front view, a rear view, a side view, or a view that includes the first vehicle in other angles and/or positions. Alternatively, the first set of license plate images may be collated from multiple views of the first vehicle.

The first vehicle may be associated with one or more states in the sequence of image frames, which may be captured from different locations, such as streets, highways, parking lots, tunnels, roadsides, arcades, alleys, driveways, freeways, courts, and outside garage. The one or more states may include, but are not limited to, a moving state, a halt state, an accelerating state, or a decelerating state. Different states may introduce noise at different levels in the first set of license plate images. Therefore, in certain embodiments, the first set of license plate images may include only the image frames that are least affected by noise from different states of the first vehicle. Each image frame in the first set of license plate images may include different alphanumeric characters that may collectively represent a license plate number of a particular vehicle. Different alphanumeric characters in each image frame of the first set of license plate images may be arranged in at least one of a left-to-right sequence or a right-to-left sequence. Examples of alphanumeric characters may include, but are not limited to, alphabets (such as "A", "a", "B", "b"), numbers (such as "1", "2"), special characters (such as "*", "&"), and non-English alphabets (such as "β" and "π").

In order to extract a license plate number of a vehicle from a captured video, a conventional electronic device may implement a brute force character recognition approach, where the conventional electronic device may apply an OCR technique on each image frame of the video and extract a license plate number from each image frame of the captured video. Application of the OCR technique on each image frame of the captured video may be a computationally resource intensive process, especially in the case where the conventional electronic device is installed in vehicles or a limited resource environment, etc. Also, output license plate numbers obtained by the application of the OCR technique from multiple noisy images of a single license plate may have multiple variations. In contrast with the conventional electronic device, the electronic device 102 may be configured to extract the license plate number of the vehicle 112 by application of a CTC-based DNN on the first set of license plate images, followed by an incremental 3D beam search operation. The 3D beam searching operation may not require decoding of every likelihood value in different layers of output feature vector (e.g., a 3D matrix of CTC logits for different images). Instead, only prominent likelihood values (e.g., two or more maximum likelihood paths) may be decoded to identify a single license plate number among multiple noisy images of one or more license plates.

The electronic device 102 may be configured to store a pre-trained connectionist temporal classification (CTC)-based DNN in memory of the electronic device 102. The pre-trained CTC-based DNN corresponds to a deep learning model that may already be trained on different datasets of license plate images and associated ground truth texts. The pre-trained CTC-based DNN may be retrieved from the server 108, via the communication network 106, based on a requirement to recognize different alphanumeric characters of the first license plate from the first set of license plate images. Alternatively, a CTC-based DNN may be initially trained by the electronic device 102 based on different datasets of images that include license plate numbers of different vehicles and ground truth texts that may correspond to labels for the datasets of images.

In accordance with an embodiment, the CTC-based DNN may be a combination of a convolutional neural network (CNN) and a long short-term memory (LSTM)-based recurrent neural network (RNN) trained on a CTC model. The CTC-based DNN may include an input layer of a deep CNN that may receive different spatial samples (e.g., different patches of license plate image) of each license plate image from the first set of license plate images in a sequential pattern.

The electronic device 102 may be configured to estimate a set of two dimensional (2D) CTC matrices based on application of the pre-trained CTC-based DNN on the first set of license plate images. Each of the set of 2D CTC matrices may be associated with at least one image frame in the first set of license plate images. Each 2D CTC matrix may include a set of likelihood values that represent a likelihood of occurrence of different alphanumeric characters, from a sample space of alphanumeric characters, for different spatial samples of a corresponding license plate image of the first set of license plate images. In the application of the pre-trained CTC-based DNN, a feature vector may be outputted by the CNN for each spatial sample of a corresponding license plate image fed to the CNN. The feature vector may depict a set of features associated with a license plate number depicted in each license plate image of the first set of license plate images. The output layer of the deep CNN may be linked to an input layer of an LSTM-based RNN. The LSTM-based RNN may be configured to generate a score that represents a likelihood of presence of each alphanumeric character from a sample space of alphanumeric characters, in different spatial samples of a corresponding license plate image in the first set of license plate images. The score may correspond to a class probability for a particular alphanumeric character in a spatial sample of a corresponding license plate image.

Figure 3B:
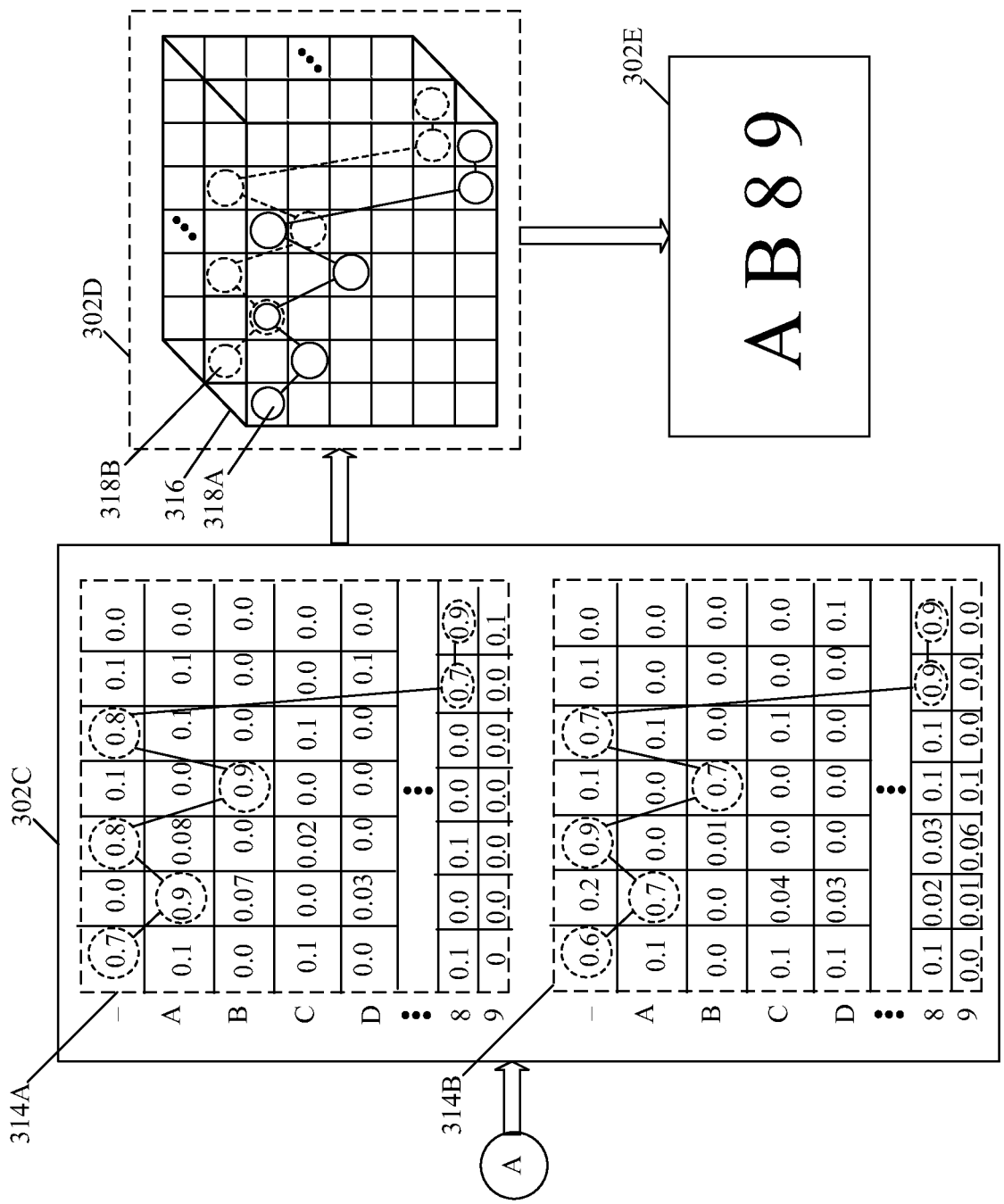

The LSTM-based RNN may include a CTC output layer, which may be configured to output class probabilities that represent a likelihood of occurrence of alphanumeric characters in different spatial samples of a corresponding license plate image in the set of license plate images. The class probabilities for different spatial samples of a license plate image may be represented as a set of likelihood values within an estimated 2D CTC matrix. Each column of an estimated 2D CTC matrix may represent a different spatial sample of a license plate image from the first set of license plate images and each row may represent a class probability of a particular alphanumeric character for different spatial samples of the license plate image. An example of two estimated CTC matrices is shown in FIG. 3B.

In one example, the electronic device 102 may be configured to determine, by the application of the LSTM-based RNN (pre-trained model), a set of likelihood values for different alphanumerical characters in each spatial sample of at least the first license plate image and the second license plate image. Examples of the plurality of alphanumerical characters may include, but are not limited to, a set of alphabets such as "A", "a", "B", "b", a set of numbers such as "1", "2", a set of special characters such as "*", "&", and a set of non-English alphabets such as "β" and "π". Based on the application of the LSTM-based RNN, the electronic device 102 may be configured to output a 2D CTC matrix that includes a maximum likelihood value for a first alphanumeric character (e.g., "A") in the first column and a second alphanumeric character "B" in the second column of the 2D CTC matrix.

The electronic device 102 may be further configured to generate a three dimensional (3D) CTC matrix from the estimated set of 2D CTC matrices. The 3D CTC matrix may correspond to a stack of the estimated set of 2D CTC matrices. Alternatively stated, the 3D CTC matrix may include a plurality of 2D layers. Each of the plurality of 2D layers may correspond to a different 2D CTC matrix of the set of 2D CTC matrices. The electronic device 102 may be further configured to decode a set of alphanumeric characters of a license plate number on the first license plate among one or more license plates. The set of alphanumeric characters may be decoded based on a 3D beam search through the generated 3D CTC matrix. The 3D beam search may correspond to an incremental beam searching operation in a direction of the maximum likelihood values, within the stack of the 3D CTC matrix, for different alphanumeric characters of the license plate number.

In the incremental beam searching operation, the electronic device 102 may be configured to generate a graph (e.g. a tree) having a root node in a first 2D CTC matrix and multiple child nodes that span one or more branches across deeper layers of the 3D CTC matrix. The 3D beam search may include a selection of a license plate number with a maximum likelihood in the corresponding layer of the 3D CTC matrix. The electronic device 102 may be configured to initially select a root node for a set of alphanumeric characters that correspond to maximum likelihood values in a root layer (or first layer) of the 3D CTC matrix. After the selection of the root node, the electronic device 102 may be configured to select only the most probable child node(s) that may likely represent the set of alphanumeric characters of the first license plate, in subsequent layers of the 3D CTC matrix. Alternatively stated, the electronic device 102 may be configured to select only those child nodes that follow a likelihood pattern similar to that of the root node.

In some embodiments, for different spatial samples corresponding to subsequent layers of the 3D CTC matrix, the likelihood value for different alphanumeric characters forming the license plate number in subsequent layers of the 3D CTC matrix should follow a similar likelihood pattern (or a path) to that of the first layer of the 3D CTC matrix. The remaining likelihood values for other alphanumeric characters in the 3D CTC matrix may be discarded, which may allow the electronic device 102 to selectively decode only those likelihood values (in different layers of the 3D CTC matrix), which represent most probable paths to identify the license plate number in the incremental beam searching operation. Thus, in the incremental beam searching operation, the electronic device 102 may be configured to implement a greedy search strategy, in which only select likelihood values are processed to decode the set of alphanumeric characters of the license plate number imprinted on the first license plate. The decoded set of alphanumeric characters may correspond to maximum likelihood values for the decoded set of alphanumeric characters in the 3D beam search through the generated 3D CTC matrix.

In some embodiments, the electronic device 102 may be further configured to determine a confidence score for each alphanumeric character in the decoded set of alphanumeric characters. The determined confidence score may indicate a probability that an alphanumeric character in the decoded set of alphanumeric characters corresponds to that of the license plate number imprinted on the first license plate.

In accordance with an embodiment, a loss function for the pre-trained CTC-based DNN may be estimated by the electronic device 102. The loss function (also referred to as a cost function) may correspond to a measure of how good the CTC-based DNN performs with respect to training inputs and expected outputs. The loss function may correspond to a neural network cost function that may be optimized in a training stage and even in deployment stage at the electronic device 102. The optimization of the loss function, i.e. an objective function for the CTC-based DNN, may correspond to minimization of the loss function for given parameters (e.g. weights ($w_i$) and a learning rate (a)) of the CTC-based DNN. Such optimization may be done based on different optimization techniques. Examples of such optimization techniques may include, but are not limited to gradient descent, stochastic gradient descent (SGD), batch gradient descent, mini-batch gradient descent, Adagrad, Adadelta, and adaptive moment estimation (Adam). The electronic device 102 may be further configured to update the pre-trained CTC-based DNN based on the loss function estimation in the decoding of the set of alphanumeric characters on the first license plate.

In accordance with an embodiment, the decoded set of alphanumeric characters may include a plurality of blank characters (i.e., blank spaces) inserted in between the decoded set of alphanumeric characters of the first license plate. The plurality of blank characters may be inserted based on a likelihood value of different alphanumeric characters in different spatial samples of a corresponding license plate image of the first set of license plate images. More specifically, a blank character from the plurality of blank characters may be inserted to differentiate between redundant occurrences of an alphanumeric character from a successively repeating alphanumeric character of the license plate number, in the decoded set of alphanumeric characters.

The electronic device 102 may be configured to remove the redundant occurrences of the alphanumeric character from the decoded set of alphanumeric characters. Also, the electronic device 102 may be further configured to remove the plurality of blank characters from the decoded set of alphanumeric characters. For example, for a license plate number, "CD115", the plurality of alphanumeric characters may include "CCCD11-115". In order to differentiate between repeating alphanumeric characters, such as "11" in "CD115" from redundant alphanumeric characters, such as "11" in "CCCD11115", a blank character, such as a hyphen ("-") may be present in "CCCD11-115". The electronic device 102 may be configured to remove the repeating characters that don't have a hyphen and the hyphen itself thereby leaving "CD115", which may be the target license plate number on the first license plate. In brief, the set of alphanumeric characters that represent the license plate number may be obtained based on the removal of the redundant occurrences of the alphanumeric character and of the plurality of blank characters from the decoded set of alphanumeric characters.

The electronic device 102 may be further configured to identify the license plate number on the first license plate, based on the decoded set of alphanumeric characters. The decoded set of alphanumeric characters may collectively be the license plate number on the first license plate, i.e. a target license plate. Thereafter, the electronic device 102 may be configured to accumulate, from the first set of license plate images, a second set of license plate images that correspond to the maximum likelihood values for occurrence of the license plate number in the 3D beam search. Alternatively stated, only those image frames are accumulated that bear the identified license plate number of the first license plate.

In some implementations of the electronic device 102, there may be a requirement to further identify a first vehicle associated with the identified license plate number and details of the owner or the driver of the first vehicle. In such implementations, the electronic device 102 may be further configured to retrieve, from the server 108, a first vehicle registration number of the first vehicle. The decoded set of alphanumeric characters of the license plate number may be further compared by the electronic device 102 with the retrieved first vehicle registration number. In cases where the identified license plate number matches with the retrieved first vehicle registration number, the electronic device 102 may be configured to detect a presence of the first vehicle in the first set of license plate images. Also, the electronic device 102 may be further configured to detect the first vehicle in the sequence of image frames based on the comparison of the decoded set of alphanumeric characters of the license plate number with the retrieved first vehicle registration number.

In some embodiments, after detection of the first vehicle, the electronic device 102 may be configured to retrieve details of the owner or the driver of the first vehicle from a third party server (e.g., a state owned server for drivers) or from the server 108. In some embodiments, there may be a system-defined requirement or a user input may be received to view the details of the owner or the driver and the identified license plate number. In such cases, the electronic device 102 may be configured to control display of the identified license plate number, the first vehicle, and/or the retrieved details of the owner and/or the driver of the first vehicle.

In accordance with an embodiment, the identified license plate number may be compared, by the electronic device 102, with each of the plurality of vehicle registration numbers. Thereafter, the electronic device 102 may be configured to detect, in the sequence of image frames, whether one or more of vehicles of the plurality of vehicles are in the hotlist of vehicle, based on the comparison of the extracted license plate number with each of the plurality of vehicle registration numbers.

In conventional systems, a conventional electronic device may be configured to extract a license plate number of a vehicle from a captured video by use of a brute force character recognition approach. In the brute force character recognition approach, the conventional electronic device may apply an OCR technique on each image frame of the video and extract a license plate number from each image frame of the captured video. Application of the OCR technique on each image frame of the captured video may be a computationally resource intensive process, especially in the case where the conventional electronic device is an embedded device. Also, application of the OCR technique results in multiple variations in output license plate numbers from multiple noisy images of a single license plate. In contrast with the conventional electronic device, the electronic device 102 may be configured to extract the license plate number of the vehicle 112 by application of the incremental 3D beam searching operation in a three dimensional space of the 3D CTC matrix. The incremental 3D beam search operation may not require decoding of every likelihood value in different layers of the 3D CTC matrix. Instead, only prominent likelihood values (e.g., two or more maximum likelihood paths) may be decoded to identify a single license plate number among multiple noisy images of one or more license plates. This may further remove redundancy in false identification of a license plate number and improve a single accurate result per license plate. This may further facilitate concerned authorities to take suitable decisions and actions based on the identification of the license plate number.

Although in FIG. 1, there is shown only a single image sensor, i.e. the image sensor 104; however, the disclosure may not be so limiting and there may be a plurality of image sensors that may be configured to capture live video feeds of different scenes, where a single or multiple vehicles may be of interest for recognition of the license plate number. Similarly, the electronic device 102 is shown as different from the server 108; however, in some embodiments, the entire functionalities of the server 108 may be solely included in the electronic device 102, without a deviation from scope of the present disclosure.

Figure 2:
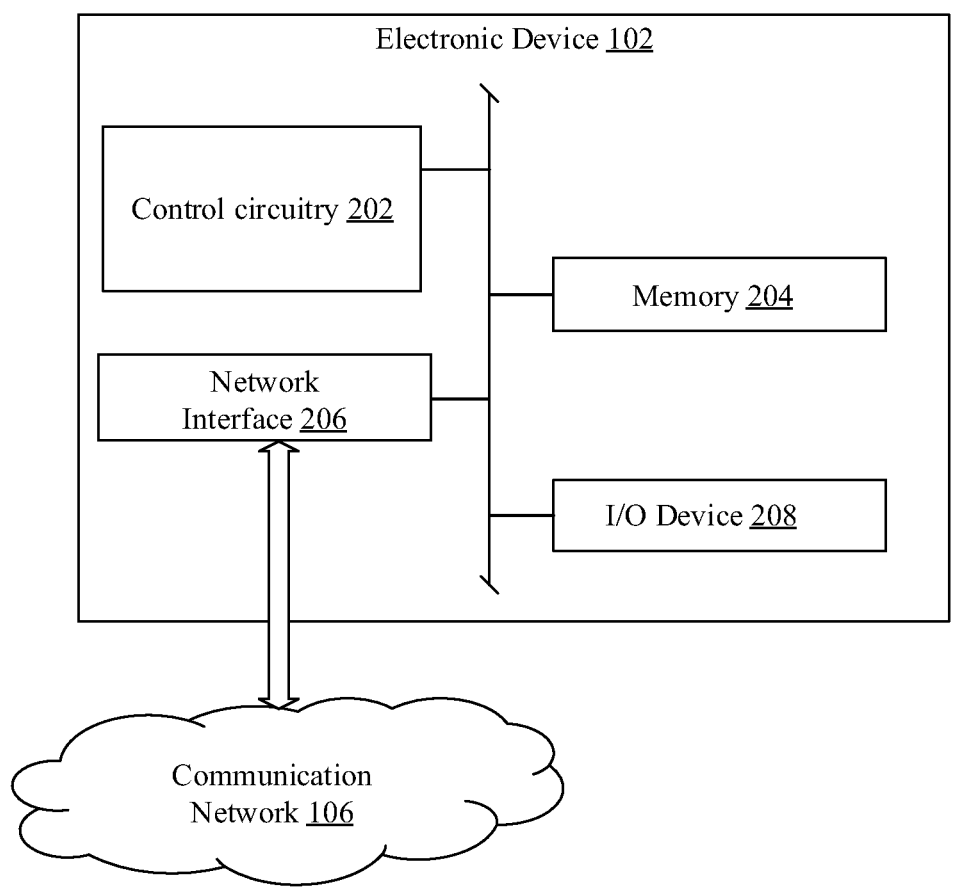
FIG. 2 is a block diagram that illustrates an exemplary electronic device for license plate number recognition based on 3D beam search, in accordance with an embodiment of the disclosure.

FIG. 2 is a block diagram that illustrates an exemplary electronic device for license plate number recognition based on 3D beam search, in accordance with an embodiment of the disclosure. With reference to FIG. 2, there is shown a block diagram 200 of the electronic device 102. The electronic device 102 includes control circuitry 202, a memory 204, a network interface 206, and an input/output (I/O device) 208.

The control circuitry 202 may include suitable logic, circuitry, interfaces, and/or code that may be configured to execute instructions stored in the memory 204. More specifically, the control circuitry 202 may be configured to identify a license plate number from a first set of license plate images extracted from a sequence of image frames stored in the memory 204. The license plate number of a first license plate may be recognized based on decoding a set of alphanumeric characters from a 3D CTC matrix, which may be a stack of a set of 2D CTC matrices. Each 2D CTC matrix may include a set of likelihood parameters for different alphanumeric characters with different spatial samples of a corresponding license plate image. Examples of implementations of the control circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a co-processor, a microcontroller, a central processing unit (CPU), and/or other control circuits.

The memory 204 may include suitable logic, circuitry, and/or interfaces that may be configured to store instructions executable by the control circuitry 202. The memory 204 may be configured to store the sequence of image frames associated with one or more vehicles and the extracted first set of license plate images of one or more license plates of the one or more vehicles. Also, the memory 204 may be configured to store the pre-trained CTC-based DNN and outputs from the pre-trained CTC-based DNN. Examples of implementation of the memory 204 may include, but are not limited to, Random Access Memory (RAM), Read Only Memory (ROM), Hard Disk Drive (HDD), and/or a Secure Digital (SD) card.

The network interface 206 may include suitable logic, circuitry, interfaces, and/or code that may be configured to enable communication between the electronic device 102 and the server 108, via the communication network 106. The network interface 206 may implement known technologies to support wired or wireless communication with the communication network 106. The network interface 206 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or, a local buffer. The network interface 212 may communicate via wireless communication with networks, such as the Internet, an Intranet and/or a wireless network, such as a cellular telephone network, a wireless local area network (LAN) and/or a metropolitan area network (MAN). The wireless communication may use one or more of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 208 may include suitable logic, circuitry, interfaces, and/or code that may be configured to receive a plurality of user inputs from a user associated with the electronic device 102. The I/O device 208 may include various input and output devices that may be configured to communicate with the electronic device 102, the server 108, and other components that are omitted for the sake of brevity. Examples of the input devices may include, but not limited to, a touch screen, a keyboard, a mouse, a joystick, a microphone, and/or an image sensor. Examples of the output devices may include, but not limited to, a display screen (such as a Liquid Crystal Display (LCD) or a Light Emitting Diode (LED) display) and/or a speaker.

In operation, the control circuitry 202 may be configured to extract a first set of license plate images from a sequence of image frames stored in the memory 204. The first set of license plate images may correspond to one or more license plates affixed on a front portion, back portion, or a side portion of a first vehicle. In order to identify different alphanumeric characters of a license plate number on a first license plate of the first vehicle (e.g., a target vehicle or a hot-listed vehicle), the control circuitry 202 may be configured to estimate a set of 2D CTC matrices based on application of a pre-trained CTC-based DNN on the extracted first set of license plate images. A 3D CTC matrix may be generated by the control circuitry 202, from the estimated set of 2D CTC matrices. The 3D CTC matrix may correspond to a stack of the estimated set of 2D CTC matrices. The control circuitry 202 may be further configured to decode a set of alphanumeric characters of a license plate number of a first license plate among the one or more license plates. The set of alphanumeric characters may be decoded based on a 3D beam search through the generated 3D CTC matrix. The decoded set of alphanumeric characters may correspond to maximum likelihood values for the decoded set of alphanumeric characters in the 3D beam search through the generated 3D CTC matrix. The details of the operation of the control circuitry 202 is further described in detail, for example, in FIGS. 3A and 3B.

FIGS. 3A and 3B, collectively, illustrate an exemplary scenario for license plate number recognition based on three dimensional (3D) beam search by the electronic device of FIG. 2, in accordance with an embodiment of the disclosure. FIGS. 3A and 3B are explained in conjunction with elements from FIGS. 1 and 2. With respect to FIGS. 3A and 3B, there is shown an exemplary scenario 300 for license plate number recognition based on 3D beam search.

At 302A, a sequence of image frames may be captured from a field-of-view (e.g., the FOV 110) of the image sensor 104. The sequence of image frames depicts the vehicle 112 having a license plate number imprinted on a first license plate of the vehicle 112. The captured sequence of image frames may be part of a video or a collated set of license plate images from different videos of the vehicle 112 at one or more locations.

At 302B, a first set of license plate images, such as a first license plate image 304A and a second license plate image 304B, may be extracted from the sequence of image frames. As shown in one example, the first license plate image 304A and the second license plate image 304B are extracted from the two different image frames of the sequence of image frames, respectively. The first license plate image 304A and the second license plate image 304B may be down-sampled or downscaled to obtain visually identifiable yet lighter versions of the first license plate image 304A and the second license plate image 304B, respectively.

The control circuitry 202 may be configured to extract the first license plate image 304A and the second license plate image 304B by use of a pattern-based technique (e.g., template matching), a shape-based technique, or other known techniques for extraction of license plate images. Examples of other known techniques may include, but are not limited to, scale invariant feature transform (SIFT), Speeded-Up Robust Features (SURF), Oriented FAST and Rotated BRIEF (ORB), Histogram of oriented Gradients (HOG), Binary Robust Independent Elementary Features (BRIEF).

The control circuitry 202 may be further configured to partition each of the first license plate image 304A and the second license plate image 304B to a plurality of spatial samples, e.g., 2D patches. Each spatial sample of the plurality of spatial samples may depict one of an alphanumeric character or a blank space (represented by hyphen) corresponding to a license plate number on a first license plate. For example, as shown, the first license plate image 304A may be partitioned into a first spatial sample 306A, a second spatial sample 306B, a third spatial sample 306C, a fourth spatial sample 306D, a fifth spatial sample, 306E, a sixth spatial sample 306F, and a seventh spatial sample 306G. The first license plate image 304A includes a set of alphanumeric characters, such as a first character 308A, a second character 308B, a third character 308C, and a fourth character 308D. Similarly, as shown, the second license plate image 304B may be partitioned into a first spatial sample 310A, a second spatial sample 310B, a third spatial sample 310C, a fourth spatial sample 310D, a fifth spatial sample 310E, a sixth spatial sample 310F, and a seventh spatial sample 310G. The second license plate image 304B may include a first character 312A, a second character 312B, a third character 312C, and a fourth character 312D.

With reference to FIG. 3B, at 302C, the control circuitry 202 may be configured to estimate a first 2D CTC matrix 314A and a second 2D CTC matrix 314B, based on application of a pre-trained CTC-based DNN on the first license plate image 304A and the second license plate image 304B, respectively. The CTC-based DNN may be a combination of a CNN and a LSTM-based RNN trained on a CTC model. The CTC-based DNN may include an input layer of a CNN that may receive different spatial samples (e.g., different patches of image frame) of the first license plate image 304A and the second license plate image 304B, respectively, at different points in time in a sequential pattern. The details of the pre-trained CTC-based DNN is described in FIG. 1. More specifically, the control circuitry 202 may be configured to receive a first plurality of spatial samples, such as the first spatial sample 306A, the second spatial sample 306B, the third spatial sample 306C, the fourth spatial sample 306D, the fifth spatial sample 306E, the sixth spatial sample 306F, and the seventh spatial sample 306G. Each spatial sample may be received in a sequential manner at a different point in time. In the application of the pre-trained CTC-based DNN, a feature vector may be outputted by the CNN for each spatial sample of the first license plate image 304A and the second license plate image 304B that is fed to the CNN. The feature vector may depict a set of features associated with a license plate number depicted in the first license plate image 304A and the second license plate image 304B. The output layer of the CNN may be linked to an input layer of the LSTM-based RNN. The LSTM-based RNN may be configured to generate a score that indicates a likelihood of presence of each alphanumeric character from a sample space of alphanumeric characters, in different spatial samples of the first license plate image 304A and the second license plate image 304B. The score may correspond to a class probability for a particular alphanumeric character in a spatial sample of a corresponding license plate image, i.e. the first license plate image 304A or the second license plate image 304B.

Each of the first 2D CTC matrix 314A and the second 2D CTC matrix 314B may be associated with the first license plate image 304A and the second license plate image 304B, respectively. Both the first 2D CTC matrix 314A and the second 2D CTC matrix 314B may include a set of likelihood values that represent a likelihood of occurrence of different alphanumeric characters from a sample space of alphanumeric characters, for different spatial samples of on the first license plate image 304A and the second license plate image 304B, respectively. The columns of the first 2D CTC matrix 314A and the second 2D CTC matrix 314B may represent different spatial samples of the first license plate image 304A and the second license plate image 304B, respectively. Similarly, the rows of the first 2D CTC matrix 314A and the second 2D CTC matrix 314B may represent class probabilities of different alphanumeric characters for different spatial samples of the first license plate image 304A and the second license plate image 304B, respectively.

At 302D, the control circuitry 202 may be configured to generate a 3D CTC matrix 316 from the first 2D CTC matrix 314A and the second 2D CTC matrix 314B. The 3D CTC matrix 316 may correspond to a stack of the first 2D CTC matrix 314A and the second 2D CTC matrix 314B. Alternatively stated, the 3D CTC matrix 316 may include a first 2D layer and a second 2D layer that may correspond to the first 2D CTC matrix 314A and the second 2D CTC matrix 314B, respectively. The control circuitry 202 may be further configured to decode a set of alphanumeric characters of a license plate number (such as, "AB89") on the first license plate image 304A and the second license plate image 304B. The set of alphanumeric characters may be decoded based on a 3D beam search through the generated 3D CTC matrix 316. The 3D beam search may correspond to an incremental beam searching operation in a direction of the maximum likelihood values, within the stack of the 3D CTC matrix, for different alphanumeric characters of the license plate number.

The control circuitry 202 may be configured to execute the incremental beam searching operation on the generated 3D CTC matrix 316 incrementally, layer by layer. In the 3D beam searching operation, the control circuitry 202 may be configured to generate a graph (e.g. a tree) having a root node in the first 2D CTC matrix 314A and child nodes that span one or more branches in the second 2D CTC matrix 314B. The 3D beam search may include selection of a license plate number with maximum likelihoods in the corresponding layer of the 3D CTC matrix 316. The selection of different alphanumeric characters in the first layer and the second layer follows a first pattern 318A and a second pattern 318B, respectively. From the first layer of the 3D CTC matrix 316, a first set of alphanumeric characters are decoded from likelihood values, which include "0.7" for hyphen ("-"), "0.9" for "A", "0.8" for hyphen, "0.9 for "B", "0.8" for hyphen, "0.7" for "8", and "0.9" for "9". The label corresponding to the plurality of alphanumeric characters is "-A-B-89", which follows the first pattern 318A, as shown. Similarly, from the second layer of the 3D CTC matrix 316, a second set of alphanumeric characters are decoded from likelihood values, which include "0.6" for hyphen ("-"), "0.7" for "A", "0.9" for hyphen, "0.7 for "B", "0.7" for hyphen, "0.9" for "8", and "0.9" for "9". The label corresponding to the plurality of alphanumeric characters is again "-A-B-89", which follows the second pattern 318B similar to the first pattern 318A, as shown.

The decoded plurality of alphanumeric characters may include a plurality of blank characters (e.g., hyphens) inserted in between the decoded plurality of alphanumeric characters from the first layer of the 3D CTC matrix 316. The control circuitry 202 may be configured to remove the plurality of blank characters from the plurality of alphanumeric characters, which may result in the set of alphanumeric characters, i.e., "AB89", i.e. the license plate number in the first license plate image 304A. The first pattern 318A associated with the set of alphanumeric characters may correspond to a root node of a tree. The control circuitry 202 may be further configured to select only the most probable child node(s) that may likely represent the set of alphanumeric characters of the second license plate image 304B, in the 3D CTC matrix 316. Alternatively stated, the electronic device 102 may be configured to select only those child nodes that follow the second pattern 318B and matches with the first pattern 318A associated with the root node. The remaining likelihoods for other alphanumeric characters may be discarded, which may allow the control circuitry 202 to selectively decode only those likelihood values in different layers of the 3D CTC matrix 316 that represent most probable paths to identify the license plate number in the incremental beam searching operation.

At 302E, the control circuitry 202 may be further configured to identify the license plate number, i.e. "AB89", on the first license plate image 304A and the second license plate image 304B based on the decoded set of alphanumeric characters. The decoded set of alphanumeric characters may collectively be the license plate number on the first license plate, i.e. a target license plate.

Figure 4A:
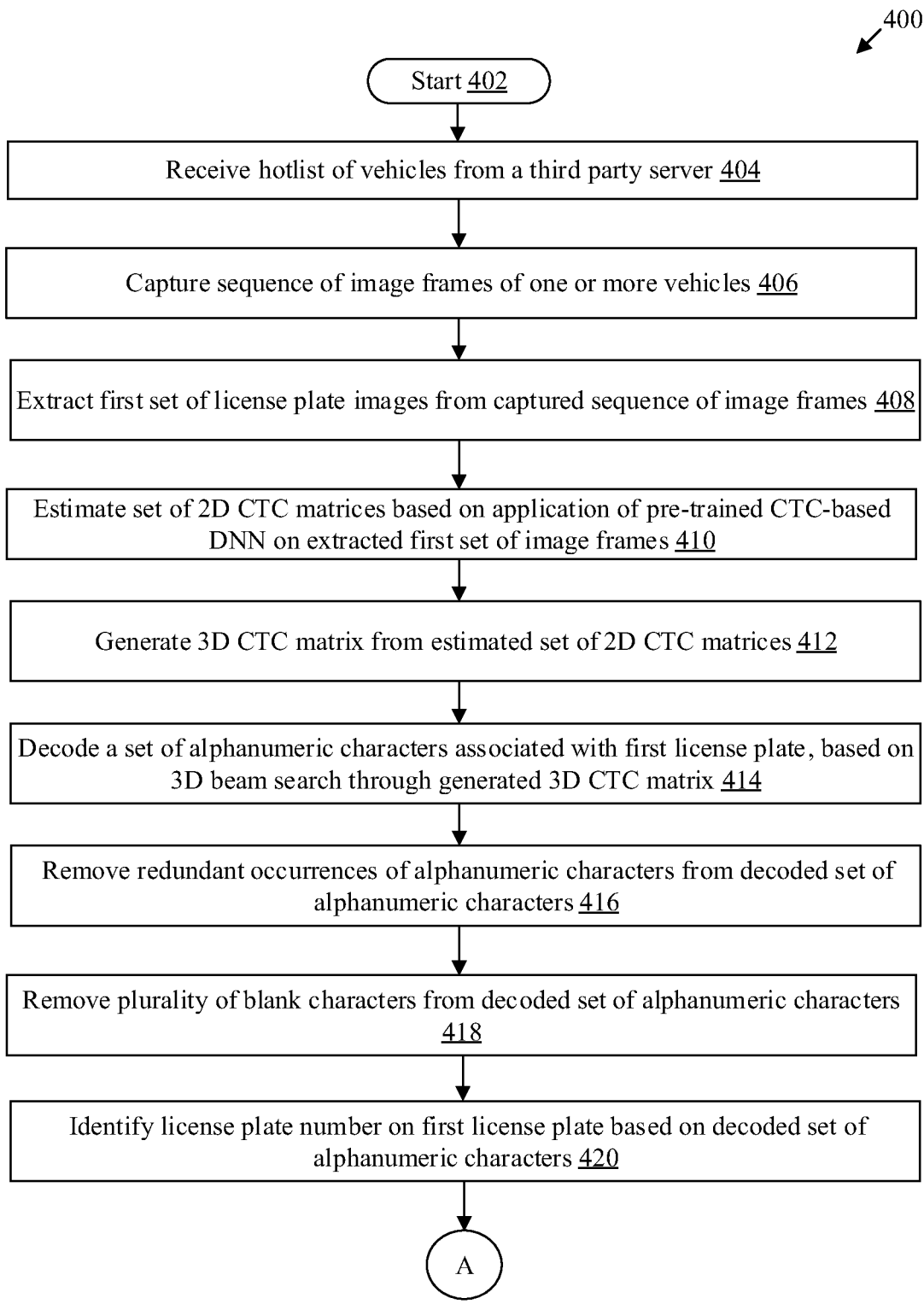
FIGS. 4A and 4B, collectively, is a flowchart that illustrates an exemplary method for license plate number recognition based on 3D beam search, in accordance with an embodiment of the disclosure.
Figure 4B:
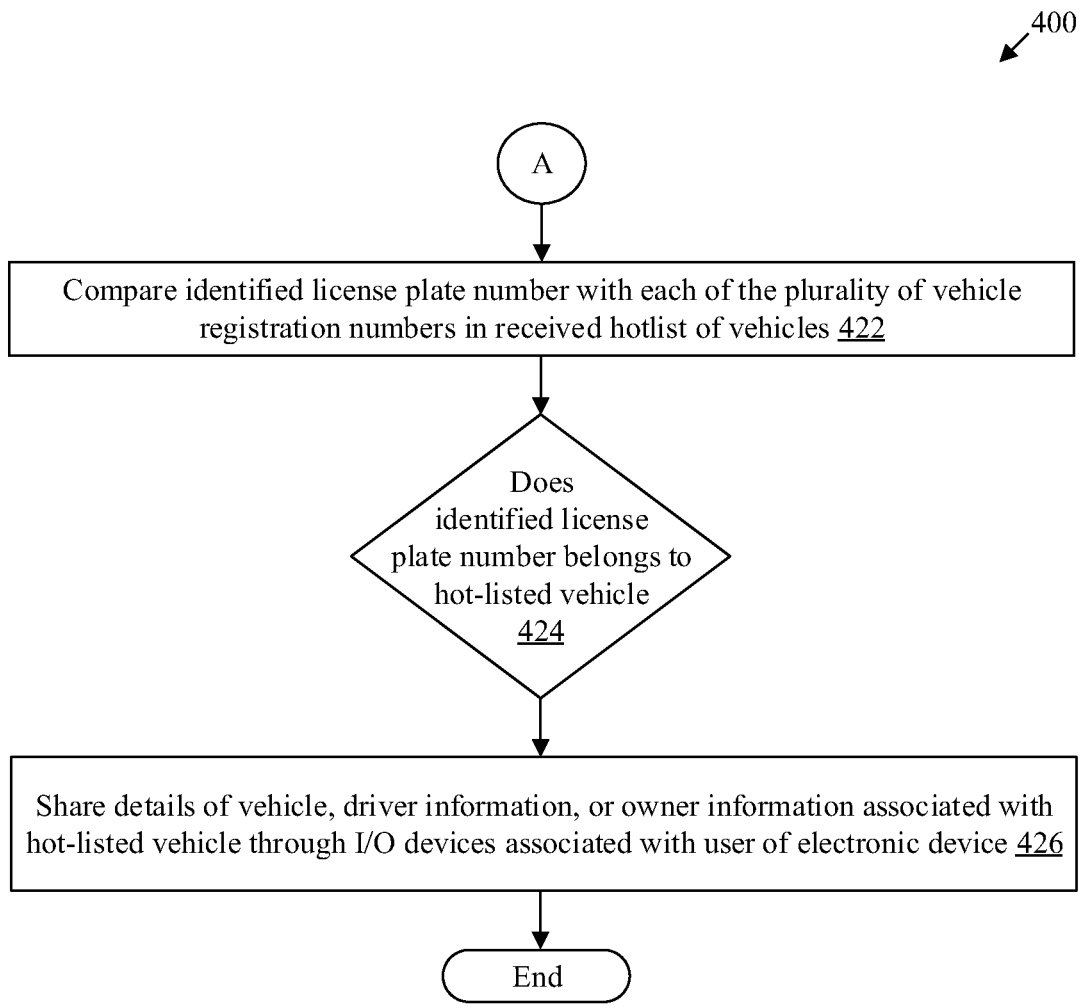

FIGS. 4A and 4B, collectively, is a flowchart that illustrates an exemplary method for license plate number recognition based on three dimensional (3D) beam search, in accordance with an embodiment of the disclosure. With reference to FIGS. 4A and 4B, there is shown a flowchart 400. The flowchart 400 is described in conjunction with elements from FIGS. 1, 2, 3A, and 3B. The method starts at 402 and proceeds to 404.

At 404, a hotlist of vehicles may be received from a third party server. The control circuitry 202 may be configured to receive the hotlist of vehicles from the third party server. The hotlist may include details of suspected drivers, vehicle information (e.g., license plate or registration details), and other relevant information, such as vehicle location, area information, and speed of vehicle.

At 406, a sequence of image frames of one or more vehicles may be captured. The image sensor 104 may be configured to capture the sequence of image frames of one or more vehicles. At 406, a first set of license plate images may be extracted from the captured sequence of image frames. The control circuitry 202 may be configured to extract the first set of license plate images from the captured sequence of image frames. The first set of license plate images may depict license plate numbers of the one or more vehicles (which may be present in FOV 110 of the image sensor 104).

At 408, a first set of license plate images may be extracted from the captured sequence of image frames. The control circuitry 202 may be configured to extract the first set of license plate images.

At 410, a set of 2D CTC matrices may be estimated based on application of a pre-trained CTC-based DNN on the first set of license plate images. The control circuitry 202 may be configured to estimate the set of 2D CTC matrices based on application of the pre-trained CTC-based DNN on the first set of license plate images. In accordance with an embodiment, the pre-trained CTC-based DNN may be a combination of a CNN and a LSTM-based RNN trained based on a CTC model.

At 412, a 3D CTC matrix may be generated from the estimated set of 2D CTC matrices. The control circuitry 202 may be configured to generate the 3D CTC matrix from the estimated set of 2D CTC matrices.

At 414, a set of alphanumeric characters associated with the first license plate may be decoded, based on a 3D beam search through the generated 3D CTC matrix. The control circuitry 202 may be configured to decode the set of alphanumeric characters associated with the first license plate based on the 3D beam search through the generated 3D CTC matrix.

At 416, redundant occurrences of alphanumeric characters may be removed from the decoded set of alphanumeric characters. The control circuitry 202 may be configured to remove the redundant occurrences of alphanumeric characters from the decoded set of alphanumeric characters.

At 418, a plurality of blank characters may be removed from the decoded set of alphanumeric characters. The control circuitry 202 may be configured to remove the plurality of blank characters from the decoded set of alphanumeric characters after removal of redundant occurrences of alphanumeric characters.

At 420, the license plate number on the first license plate may be identified based on the decoded set of alphanumeric characters. The control circuitry 202 may be configured to identify the license plate number on the first license plate based on the decoded set of alphanumeric characters. The identification may be done post the removal of the redundant occurrences of alphanumeric characters and the plurality of blank characters from the decoded set of alphanumeric characters.

At 422, the identified license plate number may be compared only with the each of the plurality of vehicle registration numbers (i.e., license plate numbers) in the received hotlist of vehicles. The control circuitry 202 may be configured to compare the identified license plate number with the each of the plurality of vehicle registration numbers in the received hotlist of vehicles for further confirmation.

At 424, it may be determined whether identified license plate number belongs to a hot-listed vehicle. The control circuitry 202 may be configured to determine whether the identified license plate number belongs to the hot-listed vehicle. In a case where the identified license plate number belongs to the hot-listed vehicle, control passes to 426. Otherwise, control passes to end.

At 426, details of vehicle, driver information, or owner information associated with the hot-listed vehicle may be shared through I/O devices associated with a user of the electronic device 102. The control circuitry 202 may be configured to share the details of the vehicle, driver information, or the owner information associated with the hot-listed vehicle through I/O devices associated with the user of the electronic device 102. Control passes to end.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer. The set of instructions in the electronic device 102 may cause the machine and/or computer to perform the operations that include storage of a sequence of image frames of at least one vehicle and extraction of a first set of license plate images of at least one license plate from the sequence of image frames. The operations may further include an estimation of a set of 2D CTC matrices based on application of a pre-trained CTC-based DNN on the first set of license plate images. Each 2D CTC matrix may include a set of likelihood values that may represent a likelihood of occurrence of different alphanumeric characters from a sample space of alphanumeric characters, for different spatial samples of a corresponding license plate image of the first set of license plate images. The operations may further include generation of a 3D CTC matrix from the estimated set of 2D CTC matrices. The 3D CTC matrix may correspond to a stack of the estimated set of 2D CTC matrices. The operations may further include decoding of a set of alphanumeric characters of a license plate number of a first license plate among the one or more license plates. The set of alphanumeric characters may be decoded based on a 3D beam search through the generated 3D CTC matrix. Also, the decoded set of alphanumeric characters may correspond to maximum likelihood values for the decoded set of alphanumeric characters in the 3D beam search through the generated 3D CTC matrix.

Certain embodiments of the disclosure may be found in an electronic device (e.g., the electronic device 102). Various embodiments of the disclosure may provide the electronic device that may include a memory (e.g., the memory 204) and control circuitry (e.g. the control circuitry 202) communicatively coupled to the memory. The memory may be configured to store a sequence of image frames of one or more vehicles. The control circuitry may be configured to extract a first set of license plate images from the sequence of image frames. The first set of license plate images may correspond to one or more license plates. The control circuitry may be configured to estimate a set of two dimensional (2D) connectionist-temporal-classification (CTC) matrices based on application of a pre-trained CTC-based deep neural network (DNN) on the first set of license plate images. Each 2D CTC matrix may include a set of likelihood values that may represent a likelihood of occurrence of different alphanumeric characters from a sample space of alphanumeric characters, for different spatial samples of a corresponding license plate image of the first set of license plate images. The control circuitry may be further configured to generate a three dimensional (3D) CTC matrix from the estimated set of 2D CTC matrices. The 3D CTC matrix may correspond to a stack of the estimated set of 2D CTC matrices. The control circuitry may be further configured to decode a set of alphanumeric characters of a license plate number of a first license plate among the one or more license plates. The set of alphanumeric characters may be decoded based on a 3D beam search through the generated 3D CTC matrix. Also, the decoded set of alphanumeric characters may correspond to maximum likelihood values for the decoded set of alphanumeric characters in the 3D beam search through the generated 3D CTC matrix.

In accordance with an embodiment, the electronic device 102 further includes an image sensor (e.g., the image sensor 104). The image sensor may be configured to capture the sequence of image frames of the one or more vehicles.

In accordance with an embodiment, the pre-trained CTC-based DNN may be a combination of a convolutional neural network CNN) and a long short-term memory (LSTM)-based recurrent neural network (RNN) trained based on a CTC model. The control circuitry may be configured to update the pre-trained CTC-based DNN based on a loss estimation in the decoding of the set of alphanumeric characters of the first license plate.

In accordance with an embodiment, the control circuitry may be further configured to retrieve, from a server (e.g., the server 108), a first vehicle registration number of a first vehicle (e.g., the vehicle 112) and compare the decoded set of alphanumeric characters of the license plate number (e.g., AB89) with the retrieved first vehicle registration number. Thereafter, based on the comparison of the decoded set of alphanumeric characters of the license plate number with the retrieved first vehicle registration number, the control circuitry may be further configured to detect the first vehicle in the sequence of image frames.

In accordance with an embodiment, a plurality of blank characters may be present in between the decoded set of alphanumeric characters of the first license plate. The plurality of blank characters may be present based on a likelihood value of different alphanumeric characters in different spatial samples of a corresponding license plate image of the first set of license plate images. A blank character from the plurality of blank characters may be inserted to differentiate between redundant occurrences of an alphanumeric character from a successively repeating alphanumeric character of the license plate number, in the decoded set of alphanumeric characters.

In accordance with an embodiment, the control circuitry may be further configured to remove the redundant occurrences of the alphanumeric character from the decoded set of alphanumeric characters. Also, the plurality of blank characters may be removed by the control circuitry from the decoded set of alphanumeric characters after the removal of the redundant occurrences of the alphanumeric character. The decoded set of alphanumeric characters of the license plate number are obtained further based on the removal of the redundant occurrences of the alphanumeric character and of the plurality of blank characters from the set of alphanumeric characters.

In accordance with an embodiment, the 3D beam search may correspond to an incremental beam searching operation in a direction of the maximum likelihood values, within the stack of the 3D CTC matrix, for different alphanumeric characters of the license plate number. The control circuitry may be further configured to identify the license plate number of the first license plate based on the decoded set of alphanumeric characters.

In accordance with an embodiment, the control circuitry may be further configured to retrieve, from a server, a hotlist of vehicles that may include a plurality of vehicle registration numbers of a plurality of vehicles and compare the identified license plate number with each of the plurality of vehicle registration numbers. Thereafter, it may be determined, in the sequence of image frames, whether one or more of vehicle of the plurality of vehicles are in the hotlist of vehicle. The determination may be done based on the comparison of the identified license plate number with each of the plurality of vehicle registration numbers.

In accordance with an embodiment, the control circuitry may be further configured to accumulate, from the first set of license plate images, a second set of license plate images that correspond to the maximum likelihood values for occurrence of the license plate number in the 3D beam search.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   a memory configured to store a sequence of image frames of at least one vehicle; and
   control circuitry configured to:
      extract a first set of license plate images from the sequence of image frames, wherein the first set of license plate images corresponds to at least one license plate of the at least one vehicle;
      estimate a set of two dimensional (2D) connectionist-temporal-classification (CTC) matrices based on application of a pre-trained CTC-based deep neural network (DNN) on the extracted first set of license plate images;
      generate a three dimensional (3D) CTC matrix from the estimated set of 2D CTC matrices, wherein the 3D CTC matrix corresponds to a stack of the estimated set of 2D CTC matrices; and
      decode a set of alphanumeric characters of a license plate number of a first license plate among the at least one license plate,
         wherein the set of alphanumeric characters are decoded based on a 3D beam search through the generated 3D CTC matrix, and
         wherein the decoded set of alphanumeric characters corresponds to maximum likelihood values for the decoded set of alphanumeric characters in the 3D beam search through the generated 3D CTC matrix.

2. The electronic device according to claim 1, further comprising an image sensor, wherein the image sensor is configured to capture the sequence of image frames of the at least one vehicle.

3. The electronic device according to claim 1, wherein the sequence of image frames comprises at least one image of the first license plate.

4. The electronic device according to claim 1, wherein each 2D CTC matrix comprises a set of likelihood values that represent a likelihood of occurrence of different alphanumeric characters from a sample space of alphanumeric characters for different spatial samples of a corresponding license plate image of the first set of license plate images.

5. The electronic device according to claim 1, wherein the pre-trained CTC-based DNN is a combination of a convolutional neural network (CNN) and a long-short term memory (LSTM)-based recurrent neural network (RNN) trained based on a CTC model.

6. The electronic device according to claim 1, wherein the control circuitry is further configured to update the pre-trained CTC-based DNN based on a loss estimation in the decoding of the set of alphanumeric characters of the first license plate.

7. The electronic device according to claim 1, wherein the control circuitry is further configured to:
retrieve, from a server, a first vehicle registration number of a first vehicle; and
compare the decoded set of alphanumeric characters of the license plate number with the retrieved first vehicle registration number.

8. The electronic device according to claim 7, wherein the control circuitry is further configured to detect the first vehicle in the sequence of image frames based on the comparison of the decoded set of alphanumeric characters of the license plate number with the retrieved first vehicle registration number.

9. The electronic device according to claim 1, wherein a plurality of blank characters are present in the decoded set of alphanumeric characters of the first license plate, and wherein the plurality of blank characters are present based on a likelihood value of different alphanumeric characters in different spatial samples of a corresponding license plate image of the first set of license plate images.

10. The electronic device according to claim 9, wherein a blank character from the plurality of blank characters is present to differentiate between redundant occurrences of an alphanumeric character from a successively repeating alphanumeric character of the license plate number, in a plurality of alphanumeric characters.

11. The electronic device according to claim 10, wherein the control circuitry is further configured to:
remove the redundant occurrences of the alphanumeric character from the decoded set of alphanumeric characters; and
remove the plurality of blank characters from the decoded set of alphanumeric characters.

12. The electronic device according to claim 11, wherein the control circuitry is further configured to identify the license plate number on the first license plate based on the decoded set of alphanumeric characters.

13. The electronic device according to claim 1, wherein the 3D beam search corresponds to an incremental beam searching operation in a direction of the maximum likelihood values, within the 3D CTC matrix, for different alphanumeric characters of the license plate number.

14. The electronic device according to claim 1, wherein the control circuitry is further configured to:
retrieve, from a server, a hotlist of vehicles that comprises a plurality of vehicle registration numbers of a plurality of vehicles;
compare the license plate number with each of the plurality of vehicle registration numbers; and
detect, in the sequence of image frames, whether one or more vehicles of the plurality of vehicles are in the hotlist of vehicles, based on the comparison.

15. The electronic device according to claim 1, wherein the control circuitry is further configured to accumulate, from the first set of license plate images, a second set of license plate images that correspond to the maximum likelihood values for occurrence of the license plate number in the 3D beam search.

16. A method, comprising:
in an electronic device that comprises a memory and control circuitry:
storing, by the memory, a sequence of image frames of at least one vehicle;
extracting, by the control circuitry, a first set of license plate images from the sequence of image frames, wherein the first set of license plate images corresponds to at least one license plate of the at least one vehicle;
estimating, by the control circuitry, a set of two dimensional (2D) connectionist-temporal-classification (CTC) matrices based on application of a pre-trained CTC-based deep neural network (DNN) on the extracted first set of license plate images;
generating, by the control circuitry, a three dimensional (3D) CTC matrix from the estimated set of 2D CTC matrices, wherein the 3D CTC matrix corresponds to a stack of the estimated set of 2D CTC matrices; and
decoding, by the control circuitry, a set of alphanumeric characters of a license plate number of a first license plate among the at least one license plate, wherein the set of alphanumeric characters are decoded based on a 3D beam search through the generated 3D CTC matrix, and wherein the decoded set of alphanumeric characters corresponds to maximum likelihood values for the decoded set of alphanumeric characters in the 3D beam search through the generated 3D CTC matrix.

17. The method according to claim 16, further comprising capturing, by an image sensor, the sequence of image frames of the at least one vehicle.

18. The method according to claim 16, wherein the sequence of image frames comprises at least one image of the first license plate.

19. The method according to claim 16, wherein each 2D CTC matrix comprises a set of likelihood values that represent a likelihood of occurrence of different alphanumeric characters from a sample space of alphanumeric characters for different spatial samples of a corresponding license plate image of the first set of license plate images.

20. The method according to claim 16, wherein the pre-trained CTC-based DNN is a combination of a convolutional neural network (CNN) and a long-short term memory (LSTM)-based recurrent neural network (RNN) trained based on a CTC model.

* * * * *